US009213618B2

(12) United States Patent
Kaul et al.

(10) Patent No.: US 9,213,618 B2
(45) Date of Patent: Dec. 15, 2015

(54) STORAGE MANAGEMENT SYSTEMS AND METHODS IN HIERARCHICAL STORAGE SYSTEMS

(75) Inventors: Vidyut Kaul, Mountain View, CA (US); Subhadeep De, Sunnyvale, CA (US); Venkeepuram Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 233 days.

(21) Appl. No.: 13/420,588

(22) Filed: Mar. 14, 2012

(65) Prior Publication Data

US 2013/0073914 A1 Mar. 21, 2013

Related U.S. Application Data

(60) Provisional application No. 61/535,616, filed on Sep. 16, 2011.

(51) Int. Cl.
*G06F 11/00* (2006.01)
*G06F 11/30* (2006.01)
*G06F 12/02* (2006.01)
*G06F 11/34* (2006.01)
*G06F 17/30* (2006.01)
*H04L 29/08* (2006.01)

(52) U.S. Cl.
CPC ........ *G06F 11/3048* (2013.01); *G06F 12/0253* (2013.01); *G06F 11/3034* (2013.01); *G06F 11/3409* (2013.01); *G06F 17/30138* (2013.01); *G06F 2201/81* (2013.01); *H04L 67/1097* (2013.01)

(58) Field of Classification Search
CPC .......... G06F 17/30067; G06F 17/3007; G06F 17/30132; G06F 17/30194; G06F 11/3034; G06F 11/3048; G06F 12/0253
USPC ............................ 714/2, 3, 25, 47.1; 711/170
See application file for complete search history.

(56) References Cited

U.S. PATENT DOCUMENTS

| 6,128,715 | A | 10/2000 | Wang et al. |
| 6,314,501 | B1 | 11/2001 | Gulick et al. |
| 7,353,350 | B2 | 4/2008 | Klassen et al. |
| 7,603,532 | B2 | 10/2009 | Rajan et al. |
| 7,631,155 | B1 * | 12/2009 | Bono et al. ..................... 711/156 |

(Continued)

OTHER PUBLICATIONS

Schreuder, Willem A. "Accessing Files on Unmounted File Systems." Proceedings of the LISA 2001 15th Systems Administration Conference. Dec. 2-7, 2001, San Diego California. 7 pages.

*Primary Examiner* — Joesph Kudirka
(74) *Attorney, Agent, or Firm* — Wilmer Cutler Pickering Hale and Dorr LLP

(57) ABSTRACT

The present disclosure provides storage management systems and methods. A hierarchical configuration information process includes accessing information regarding hierarchical relationships of components associated with a storage environment. A storage resource consumption detection process includes detecting consumption of storage resources included in the storage environment. A coordinated consumption analysis process is coordinated across multiple levels of an active spindle hierarchy. A reaction process includes performing an automated consumption notification process and an automated reclamation process based upon results of the storage resource consumption detection process.

20 Claims, 8 Drawing Sheets

(56) References Cited

U.S. PATENT DOCUMENTS

| | | | |
|---|---|---|---|
| 7,653,832 B2 * | 1/2010 | Faibish et al. | 714/6.32 |
| 7,676,704 B2 * | 3/2010 | Hong et al. | 714/48 |
| 7,694,082 B2 * | 4/2010 | Golding et al. | 711/154 |
| 7,822,939 B1 | 10/2010 | Veprinsky et al. | |
| 7,941,709 B1 * | 5/2011 | Hong et al. | 714/54 |
| 8,438,362 B2 | 5/2013 | Mukherjee et al. | |
| 2008/0189498 A1 | 8/2008 | Brown | |
| 2010/0049735 A1 | 2/2010 | Hsu | |
| 2010/0191908 A1 * | 7/2010 | Yamakawa | 711/114 |
| 2011/0010495 A1 | 1/2011 | Haustein et al. | |
| 2012/0054746 A1 * | 3/2012 | Vaghani et al. | 718/1 |
| 2012/0198443 A1 | 8/2012 | Tatavarty | |
| 2012/0260050 A1 | 10/2012 | Kaliannan | |
| 2012/0271870 A1 | 10/2012 | Patwardhan et al. | |
| 2012/0278580 A1 | 11/2012 | Malige et al. | |
| 2012/0311291 A1 * | 12/2012 | Fiske et al. | 711/170 |

* cited by examiner

100

---

110
Performing a hierarchical configuration information process.

120
Performing a characteristics analysis process in which at least part of an analysis of a characteristic of the components is coordinated across multiple levels of a hierarchy associated with the storage environment.

130
Performing a reaction process based upon the results of the characteristics analysis process.

410
Performing a hierarchical configuration information process.

420
Performing a characteristics analysis process.

421
Performing a storage resource consumption detection process, including detecting consumption of storage resources included in a storage environment.

422
Performing a coordinated consumption analysis, in which at least part of the storage resource consumption analysis is coordinated across multiple levels of a hierarchy.

430
Performing a reaction process based upon the results of the characteristics analysis process.

Determining a condition at one level of the hierarchy.

---

520

Linking or propagating the condition to another level of the hierarchy.

| |
|---|
| 810<br>A hierarchical configuration information module. |
| 820<br>A characteristics analysis module in which at least part of an analysis of a characteristic of the components is coordinated across multiple levels of a hierarchy associated with the storage environment. |
| 830<br>A reaction module. |

FIG 6

STORAGE MANAGEMENT SYSTEMS AND METHODS IN HIERARCHICAL STORAGE SYSTEMS

RELATED APPLICATIONS

This application claims benefit of and priority to provisional Application No. 61/535,616 entitled Method and Apparatus to Proactively Detect Conditions That Will Lead To I/O Errors on File Systems Due To Storage Pool Exhaustion filed on Sep. 16, 2011, which is incorporated herein by reference.

Other related Applications include:

U.S. patent application Ser. No. 12/816,075, entitled Automatically Reclaiming Memory Space, filed on Jun. 15, 2010;

U.S. patent application Ser. No. 13/018,256, entitled Storage Reclamation Systems and Methods, filed on Jan. 31, 2011;

U.S. patent application Ser. No. 13/083,381, entitled Data Storage Resource Management Systems and Methods, filed on Apr. 8, 2011;

U.S. patent application Ser. No. 13/092,832, entitled A Method and System for Reclaiming Storage on a Shared Storage Device Independent of the Mount State of a File System, filed on Apr. 22, 2011;

U.S. patent application Ser. No. 13/098,294, entitled Data Storage Reclamation Systems and Methods, filed on Apr. 29, 2011; all of which are incorporated herein by reference.

FIELD OF THE INVENTION

The present embodiments relate to the field of storage resources. In one embodiment, characteristics of storage resources are analyzed.

BACKGROUND OF THE INVENTION

Electronic systems and circuits are often utilized in a number of scenarios to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended storing and processing the information. When archival or duplicate storage features are included the amount of storage resources involved can increase by orders of magnitude. Providing and managing the storage resources can be expensive and difficult.

Some traditional systems attempt to use thin provisioning approaches to reduce the amount of storage resources. For example, traditional data centers often include several storage arrays and attempt to implement thin provisioning support in which there can be several tier one servers hosting production applications trying to access the thin storage. However, in a thin storage environment there is usually over-subscription and the over-subscription often results in the file system(s) behavior being degraded by I/O errors and inconsistency if the thin pool space is exhausted by consumption or utilization. In such cases, there is usually no way from the server side to know the root cause of the I/O errors or failures on the file system front. While some traditional storage array vendor tools may have attempted to implement threshold setting capabilities on the array/enclosure side, they typically don't have the linkage across the host and array side in a convenient and efficient configuration (e.g., organized interlinking, "visible in a single pane of glass", etc.).

SUMMARY

Storage management systems and methods are presented. In one embodiment, a method comprises: performing a hierarchical configuration information process, including accessing information regarding hierarchical relationships of components associated with a storage environment; performing a storage resource consumption detection process, including detection of consumption of storage resources included in the storage environment; and performing a coordinated consumption analysis process, in which at least part of an analysis of the consumption of the storage resources is coordinated across multiple levels of an active spindle hierarchy. The coordinated consumption analysis process can include an end to end level linking in the active spindle hierarchy of the storage resource consumption. In one exemplary implementation, the consumption analysis process comprises linking the storage resource consumption at a storage pool level of the active spindle hierarchy to an application level of the active spindle hierarchy.

In one embodiment, the coordinated consumption analysis process comprises determining correlations between the consumption of the storage resources and the components, wherein at least one of the components is included in a different one of the multiple levels of the active spindle hierarchy than another one of the components. The coordinated consumption analysis process can include analyzing correlations between the consumption of the storage resources and the components, wherein at least one of the correlations crosses at least one level boundary of the multiple levels of the active spindle hierarchy.

In one embodiment, a reaction process is performed. The reaction process can include performing an automated consumption notification process based upon results of the storage resource consumption detection process. The automated consumption notification process can include forwarding a notification to a user that a storage resource consumption threshold is reached. The reaction process can include performing an automated reclamation process based upon results of the coordinated consumption analysis process. Reclamation directions can be issued on a supported file system. In one exemplary implementation, the reaction process can include performing an automated storage allocation process in which storage resources reclaimed by the automated reclamation process are automatically made available to components in need of access to storage resources.

In one embodiment, the coordinated consumption analysis process can include determining a violation condition of a storage resource consumption threshold in a storage level of the active spindle hierarchy; and propagating the violation condition to a file system level of the active spindle hierarchy. The coordinated consumption analysis process can include linking a failure at the file system level to a storage pool level. The coordinated consumption analysis process can include detecting violations for high level storage resource consumption policies. The coordinated consumption analysis processing can include identifying file systems consuming storage from the storage pools.

In one embodiment, a reprogrammable tangible computer readable medium has stored thereon, computer executable instructions that when executed by a computer system cause the computer system to perform a method comprising: performing a hierarchical configuration information process, including accessing information regarding hierarchical relationships of components associated with a storage environment; performing a storage resource consumption detection process, including detecting consumption of storage resources included in the storage environment; and performing a coordinated consumption analysis process in which at least part of an analysis of the consumption of the storage resources is coordinated across multiple levels of an active spindle hierarchy. The coordinated consumption analysis process can include an end to end level linking in the active spindle hierarchy of the storage resource consumption. The coordinated consumption analysis process can include analyzing correlations between the consumption of the storage resources and the components, wherein at least one of the correlations crosses at least one level boundary of the multiple levels of the active spindle hierarchy.

In one embodiment, a computer system comprises a processor coupled to a computer readable storage media and executing computer readable code which causes the computer system to perform operations including: performing a hierarchical configuration information process, including accessing information regarding hierarchical relationships of components associated with a storage environment; performing a storage resource consumption detection process, including detecting consumption of storage resources included in the storage environment; and performing a coordinated consumption analysis process in which at least part of an analysis of the consumption of the storage resources is coordinated across multiple levels of an active spindle hierarchy. The coordinated consumption analysis process can include an end to end level linking in the active spindle hierarchy of the storage resource consumption. The coordinated consumption analysis process can include analyzing correlations between the consumption of the storage resources and the components, wherein at least one of the correlations crosses at least one level boundary of the multiple levels of the active spindle hierarchy.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 1 is a flow chart of an exemplary method in accordance with one embodiment.

FIG. 4 is a block diagram of an exemplary storage management method in accordance with one embodiment of the present invention.

FIG. 5 is a flow chart of an exemplary coordinated consumption analysis process in accordance with one embodiment of the present invention.

FIG. 6 is a block diagram of an exemplary storage management module which includes instructions for directing a processor in performance of a storage management method in accordance with one embodiment of the present invention.

DETAILED DESCRIPTION

Figure 2:
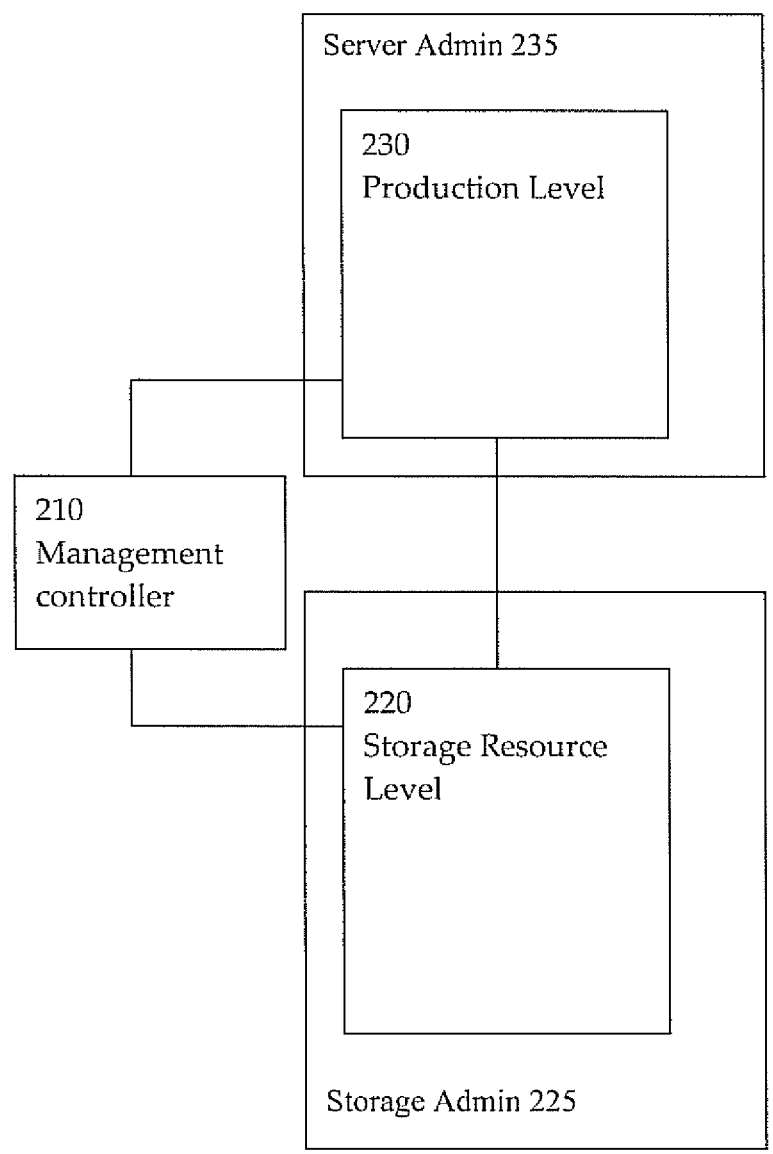
FIG. 2 is a block diagram of an exemplary storage management environment in accordance with one embodiment of the present invention.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, one ordinarily skilled in the art will understand that the present invention may be practiced without these specific details. In other instances, well known methods, procedures, components, and circuits have not been described in detail as not to unnecessarily obscure aspects of the current invention.

The systems and methods described in the following sections of the detailed description can facilitate efficient and effective information storage. In one embodiment, various characteristics or conditions (e.g., storage resource consumption, capacity, on/off line state, etc.) are determined and coordinated or linked to components associated with different levels of a hierarchy. The hierarchy can be an active spindle hierarchy. A coordinated characteristic analysis can include an end to end level coordination or linking of a characteristic or condition throughout the hierarchy. It is appreciated the analysis and coordination can be directed to a variety of characteristics or conditions (e.g., consumption, state, capacity, features, etc.). A reaction process can be performed based upon the results of the characteristic or condition analysis process. It is appreciated that a variety of reactions or additional operations can be performed (e.g., notification of exceeding a storage resource consumption threshold, initiating storage resource reclamation, etc.). Additional information on systems and methods is presented in following portions of the detailed description.

FIG. 1 is a flow chart of an exemplary method 100 in accordance with one embodiment.

In block 110, a hierarchical configuration information process is performed. In one embodiment, information regarding hierarchical relationships of components associated with a storage environment is accessed. The information can include indications of various components (e.g., thin storage pools, LUNs, hosts, file systems, application, physical environment components, virtual environment components, etc.) and how they are related (e.g., which thin storage pool includes resources assigned to a LUN that is associated with a host that hosts an application, etc.).

In block 120, a characteristics analysis process is performed. In one embodiment, at least part of an analysis of a characteristic of the components is coordinated across multiple levels of a hierarchy or mapping associated with the storage environment. The hierarchy can be an active spindle hierarchy or mapping. The characteristics analysis process can include detecting a characteristic of a component included in one level of the hierarchy and then coordinating (e.g., correlating, linking, etc.) the detected characteristic with components across multiple levels of the hierarchy. The coordinating can include attributing a condition or impact of a characteristic at one hierarchy level to another level. In one exemplary implementation, consumption of storage resources associated with a component at one hierarchy level is correlated or linked to consumption of storage resources associated with a related component at a different hierarchy level. The relationship of components and hierarchy levels can correspond to information accessed in block 110.

In one embodiment, consumption of storage resources at a storage array level are detected and the consumption is coordinated with other components (e.g., LUNs, hosts, volumes, applications, etc.) in various levels of the hierarchy. In one exemplary implementation, the consumption of 10 GB of storage resource by an application can be correlated or linked to 10 GB of storage resource consumption by a related host which can be correlated or linked to 10 GB of storage resource consumption by a related thin pool. The coordinated characteristic analysis can include an end to end level coordination or linking of the characteristic in the hierarchy. It is appreciated the analysis can be directed to a variety of characteristics or conditions (e.g., consumption, state, capacity, features, etc.).

In block 130, a reaction process is performed based upon the results of the characteristics analysis process performed in block 120. In one embodiment, the reaction process includes performing additional actions or operations based upon the characteristics analysis process. It is appreciated that a variety of reactions or additional operations can be performed. The reaction or additional operations can include forwarding a notification of a condition discovered by the characteristics analysis process (e.g., notification that a storage resource consumption threshold is reached, notification of a component capacity issue, notification a component is in an off line state, etc.). A notification (e.g., e-mail, SNMP, etc.) of the characteristic or condition can be forwarded to a user. The reaction or operations can be directed to changing the characteristic or condition (e.g., operations related to storage reclamation, operations related to bringing a component on line, failure mitigation, etc.). In one embodiment, the reaction process can also be coordinated across multiple levels of hierarchy associated with the storage environment.

While the following sections of the description are primarily directed to storage resource consumption in a storage environment, it is appreciated the present invention is readily adapted to other configurations and implementations (e.g., resource component state, storage component capacity, etc.).

In one embodiment, a method proactively detects conditions that can lead to I/O errors on file systems due to storage pool exhaustion. The detection can include an ability to determine existence of potential file system degradation conditions (e.g., I/O errors, file system failures, etc.) and link the degradation conditions to the actual storage pools. The method can also proactively aid an end user in pin pointing a reason for failure, including if the condition is due to space exhaustion within the storage pool. In one exemplary implementation, an end user is proactively notified about conditions in the environment. The notification can facilitate prevention of potential down time for the end application consuming the storage.

In one embodiment, a method directs reclamation of storage based on policies associated with storage pools. The reclamation can include proactively issuing reclamation on file systems which support reclaim capabilities to mitigate interruptions or down time due to storage pool exhaustion. To mitigate the possibility of failure or error conditions in one exemplary implementation, a policy or rule is setup which triggers issuance of a reclamation operation for file systems to "free up" or make available storage resources previously used by other fronts or components. The additional reclaimed storage resources can be utilized to facilitate continuity of service.

FIG. 2 is a block diagram of an exemplary storage management environment 200 in accordance with one embodiment of the present invention. Storage management system 200 includes management controller 210, storage resource level 220, and production level 230. Storage resource level 220 can include various storage components (e.g., storage array components, thin pool components, etc.) which can be included in different hierarchical levels within storage resource level 220. Production level 230 can include various production components (e.g., hosts, file systems, applications, etc.) which can be included in different hierarchical levels within storage resource level 220. In one embodiment, production level 230 is controlled in a server admin environment 235 and storage resource level 220 is controlled in a storage admin environment 225.

The components of storage management environment 200 cooperatively operate to perform information storage. Storage level 220 stores information for production level 230. Production level 220 performs production operations (e.g., associated with production applications, etc.) including input/output of information stored by storage level 220. Management controller 210 performs centralized management (e.g., monitoring, control, etc.) of storage resource level 220, and production level 230. The centralized management includes a characteristic analysis process in which at least part of an analysis of a characteristic is coordinated across the boundary of storage resource level 220 and production level 230. In one embodiment, the analyzed characteristic is storage resource consumption and the storage resource consumption is coordinated (e.g., linked, correlated, etc.) across the boundary of storage resource level 220 and production level 230.

In one embodiment, a correlation or linkage is setup across components of the storage resource level and components of the production level. In one exemplary implementation, the production level includes file systems and the storage resource level includes storage pools. A correlation or linkage is setup across the storage pools and the file systems consuming storage from storage pools. In one embodiment, once the linkage between components is established, an end user is allowed to setup consumption and subscription based threshold policies on storage pools. When there is a violation of the policy, the violation condition is propagated to the file system and a failure of the file system is linked to the storage pool. The policy can be directed to a threshold in terms of storage consumption. Conditions associated with a policy violation can be correlated or linked across the thin pools and the file systems consuming storage. In one exemplary implementation, this helps a user to know that the file system is potentially in a possible degrade condition as the thin pool from which the storage is given to the file system(s) is reaching exhaustion. In one embodiment, upon detecting violations for high level storage consumption policies, file systems consuming storage from the storage pools are identified and a reclaim is issued on supported file systems to mitigate I/O errors and facilitate continuity of service.

Figure 3:
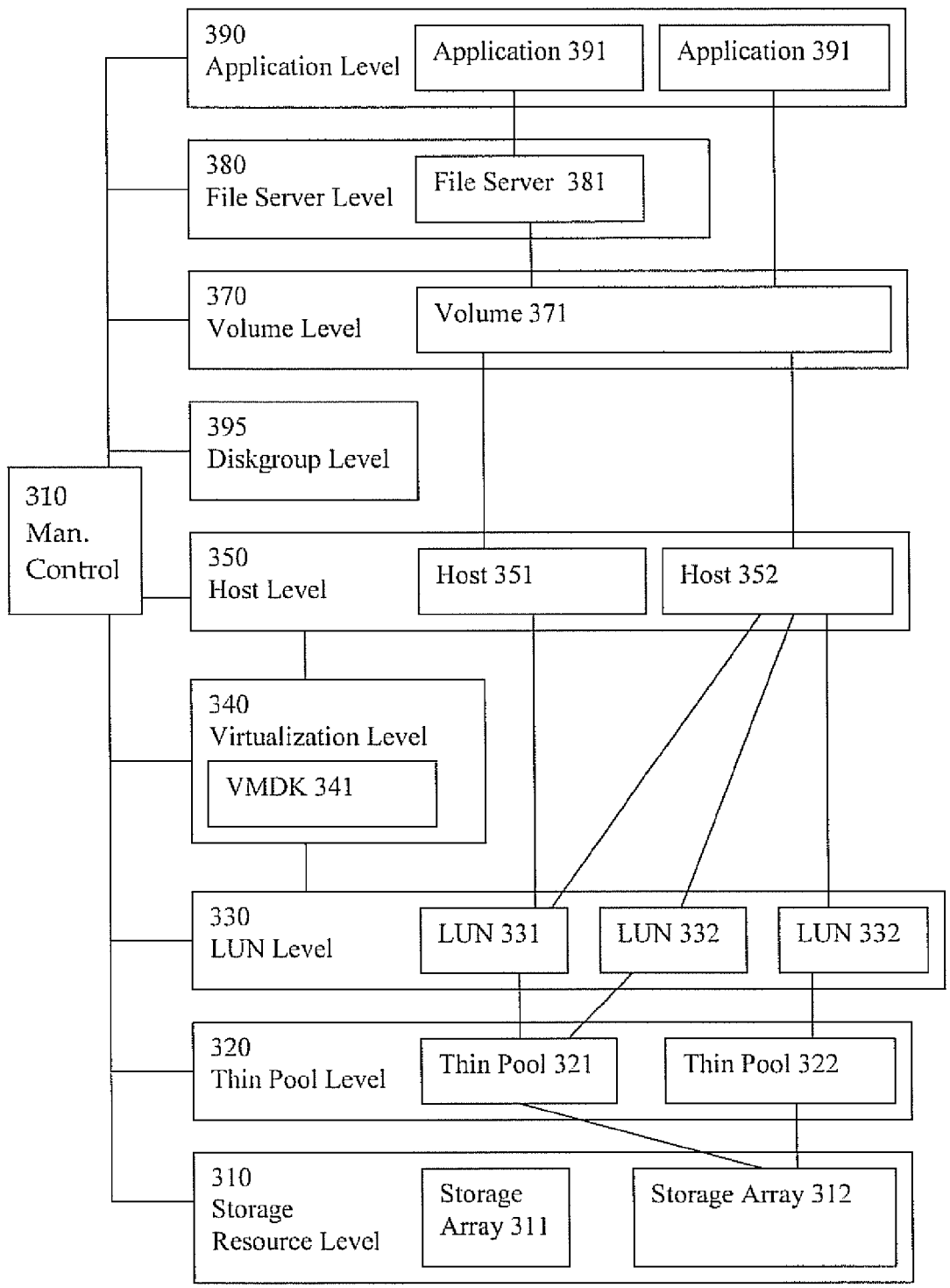
FIG. 3 is a block diagram of an exemplary storage management environment in accordance with one embodiment of the present invention.

FIG. 3 is a block diagram of an exemplary storage management environment 300 in accordance with one embodiment of the present invention. In one embodiment, storage management environment 300 is an exemplary implementation of storage management environment 200. Storage management environment 300 includes management controller 301, storage array component 311 in storage array level 310, thin pool components 321 and 322 in thin pool level 320, LUN components 331, 332 and 333 in LUN level 330, virtual components 341 and 342 in virtualization level 340, host components 351 and 352 in host level 350, volume component 371 in volume level 370, file system component 381 in file system level 380, and application components in application level 391 and 392. Storage management environment 300 can also include a diskgroup component 395 in a diskgroup level. The components of storage management environment 300 cooperatively operate to store information.

In one embodiment, an amount of storage from a storage array is allocated to a thin provision pool component and a thin provision pool component is assigned to provide storage resources for hosts to use. Hosts request and are granted a particular amount of subscribed storage resources (e.g., 10 GB, 28 GB, etc.). The hosts operate on the principle that the subscribed amount is available for their use. However, the subscribed amount of storage granted to the hosts is greater than the amount of storage resources allocated to the thin pool component resulting in over-subscription. Over time, the hosts engage in I/O accesses to the storage resources and consume the storage resources of the thin pool component. If the storage resources allocated to the thin provision component are completely consumed additional I/O accesses fail and the failure is propagated through the hierarchy (e.g., file system fail, application read/write failure, etc.).

In one embodiment, a management controller (e.g., 301) engages in a management process including performing a storage resource consumption detection process and a coordinated consumption analysis process in which analysis of the storage resource consumption is coordinated across multiple levels of a hierarchy. In one exemplary implementation, a memory I/O failure mitigation process (e.g., notification process, reclamation process, etc.) is also performed based upon the results of the memory examination process. Additional information on various processes are presented in following sections of the detailed description.

It is appreciated that the storage management systems and methods can be implemented in variety of storage environment hierarchy configurations. In one embodiment, a storage environment hierarchy configuration can include a virtualization level and another storage environment hierarchy configuration does not include a virtualization level. In one exemplary implementation, an application (e.g., 391) from an application level (e.g., 390) is linked to a file server (e.g., 381) in a file server level (e.g., 380) and another application (e.g., 391) is linked directly to a volume (e.g., 371) in a volume level (e.g., 370).

FIG. 4 is a block diagram of exemplary storage management method 400 in accordance with one embodiment of the present invention. In one embodiment, method 400 is an exemplary implementation similar to method 200.

In block 410, a hierarchical configuration information process is performed. In one embodiment, information regarding hierarchical relationships of components associated with a storage environment is accessed.

In block 420, a characteristics analysis process is performed. In one exemplary implementation, a characteristic analysis process includes performing a storage resource consumption detection process in block 421 and performing a coordinated consumption analysis process in block 422.

In one embodiment, a storage resource consumption detection process performed in block 421, includes detecting consumption of storage resources included in a storage environment. In one exemplary implementation, consumption of storage resources in an end point memory component (e.g., storage disk, storage array, etc.) that is assigned to a thin pool component is detected. An indication of storage resource consumption is received in one embodiment and compared to a threshold to detect if the consumption crosses the threshold.

In one embodiment, the coordinated consumption analysis process performed in block 422 includes coordinating at least part of the storage resource consumption analysis coordinated across multiple levels of a hierarchy. In one exemplary implementation, the hierarchy is an active spindle hierarchy. The coordinated consumption analysis process can comprise an end to end level linking in the active spindle hierarchy of the storage resource consumption. The coordinated consumption analysis process can comprise a linking from an end component to an intermediate component in the active spindle hierarchy of the storage resource consumption. The coordinated consumption analysis process comprises linking the storage resource consumption at a storage pool level of the hierarchy to an application level of the hierarchy.

In one embodiment the coordinated consumption analysis process comprises determining correlations between the consumption of the storage resources and the components, wherein at least one of the components is included in a different one of the multiple levels of the active spindle hierarchy than another one of the components. In one exemplary implementation, at least one of the correlations crosses at least one level boundary of the multiple levels of the hierarchy.

FIG. 5 is a flow chart of exemplary coordinated consumption analysis process 500 in accordance with one embodiment of the present invention.

In block 510, a condition at one level of the hierarchy is determined. In one embodiment determining a condition at one level of the hierarchy includes determining violation of a storage resource consumption threshold in a storage level of the hierarchy. In one embodiment, the coordinated consumption analysis process includes detecting violations for high level storage resource consumption policies.

In block 520, the condition is linked or propagated to another level of the hierarchy. In one embodiment, the condition (e.g., exceeding a consumption threshold, etc.) is propagated to a file system level of the hierarchy. A failure at the file system level can be linked to a storage pool level. In one embodiment, consumption analysis processing includes identifying file systems consuming storage from the storage pools.

Referring back to FIG. 4, in block 430 a reaction process is performed. In one embodiment, an automated consumption notification process is performed based upon results of the storage resource consumption detection process. The automated consumption notification process can include forwarding a notification to a user that a storage resource consumption threshold is reached. In one embodiment, an automated reclamation process is performed based upon results of the coordinated consumption analysis process. The reclamation directions can be issued on a supported file system. It is appreciated that a variety of reclamation processes can be utilized. A reclamation process can be similar to reclamation operations described in:

U.S. patent application Ser. No. 12/816,075, entitled Automatically Reclaiming Memory Space, filed on Jun. 15, 2010;

U.S. patent application Ser. No. 13/018,256, entitled Storage Reclamation Systems and Methods, filed on Jan. 31, 2011;

U.S. patent application Ser. No. 13/083,381, entitled Data Storage Resource Management Systems and Methods, filed on Apr. 8, 2011;

U.S. patent application Ser. No. 13/092,832, entitled A Method and System for Reclaiming Storage on a Shared Storage Device Independent of the Mount State of a File System, filed on Apr. 22, 2011;

U.S. patent application Ser. No. 13/098,294, entitled Data Storage Reclamation Systems and Methods, filed on Apr. 29, 2011;

all of which are incorporated herein by reference. In one exemplary implementation, an automated storage allocation process is performed in which storage resources reclaimed by the automated reclamation process are automatically made available to components in need of access to storage resources.

FIG. 6 is a block diagram of exemplary storage management module 800 which includes instructions for directing a processor in the performance of a storage management method in accordance with one embodiment of the present invention. In one embodiment, exemplary storage management module 800 includes instructions for directing a processor in the performance of a storage management method (e.g., 100, 400 etc.). Storage management module 800 includes hierarchical configuration information module 810, characteristics analysis module 820 and reaction module 830. Hierarchical configuration information module 810 includes instructions for performing a hierarchical configuration information process. In one embodiment, hierarchical configuration information module 810 includes instructions for performing a hierarchical configuration information process as indicated in block 110. The characteristics analysis module 820 includes instructions for performing a characteristics analysis process. In one embodiment, characteristics analysis 820 includes instructions for performing a characteristics analysis process as indicated in block 120. The reaction process module 830 includes instructions for performing a reaction process. In one embodiment, reaction module 830 includes instructions for performing a reaction process as indicated in block 130.

Figure 7:
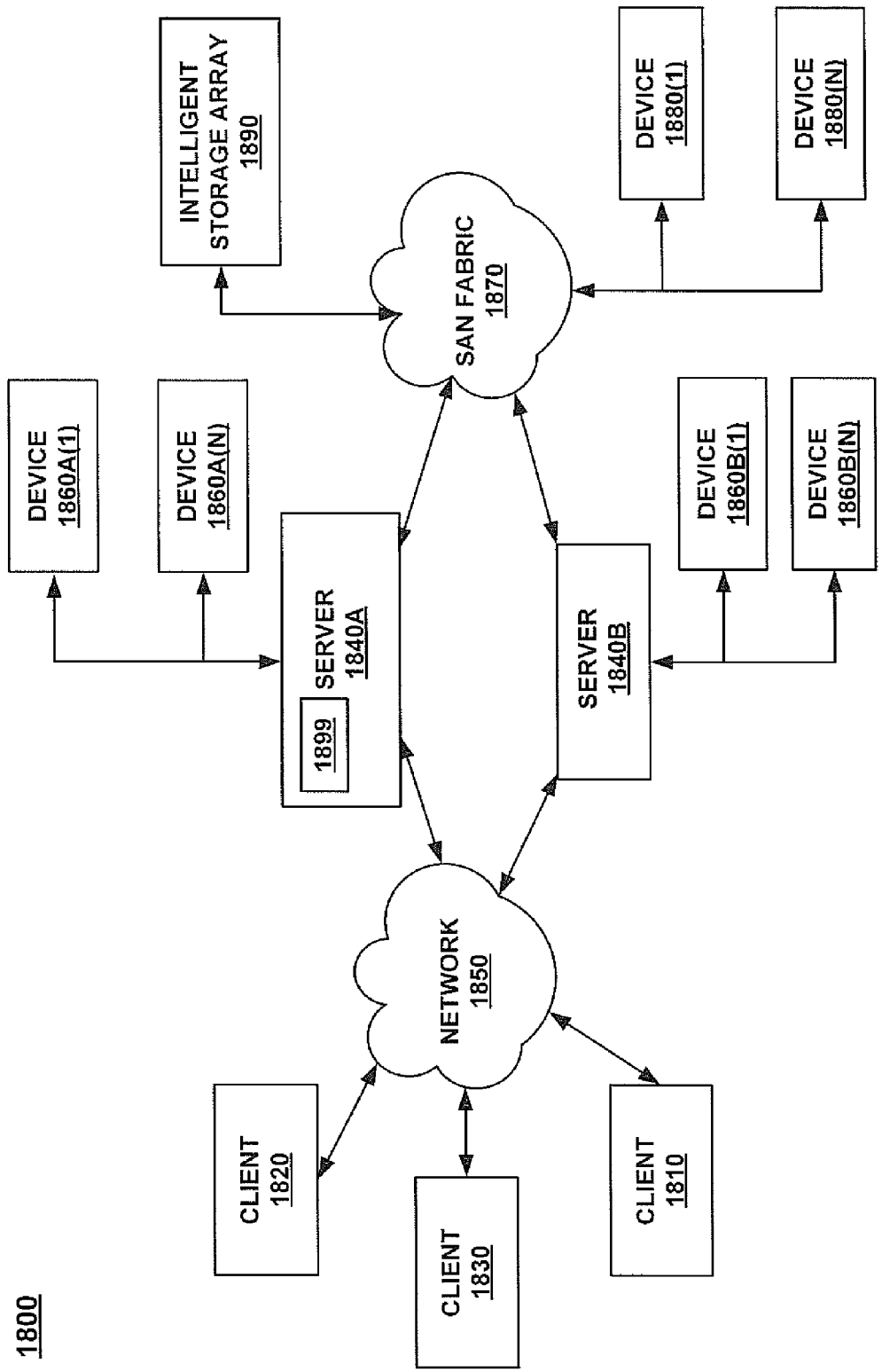
FIG. 7 is a block diagram depicting an exemplary network architecture in accordance with one embodiment of the present invention.

It is appreciated present storage management systems and methods can be implemented as part of a variety of environments. For example, archive systems and methods can be implemented as part of a distributed computing environment, a cloud computing environment, a virtual environment, a client server environment, etc. In one embodiment, a storage method (e.g., method 100, 400, etc.) can be implemented on a network. FIG. 7 is a block diagram depicting an exemplary network architecture 1800 in which client systems 1810, 1820 and 1830, as well as storage servers 1840A and 1840B (any of which can be implemented using computer system 1110 shown in FIG. 8), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880 (1)-(N) by storage servers 1840A and 1840B, and also by client systems 1810, 1820 and 1830 via network 1850. Intelligent storage array 1890 is also shown as an example of a specific storage device accessible via SAN fabric 1870. In one embodiment, server 1840A includes storage management module 1899. In one embodiment, storage management module 1899 is similar to storage management module 800. It is appreciated that present systems and methods are compatible with a variety of implementations. For example, portions of information and instructions associated with can be distributed in various resources.

Figure 8:
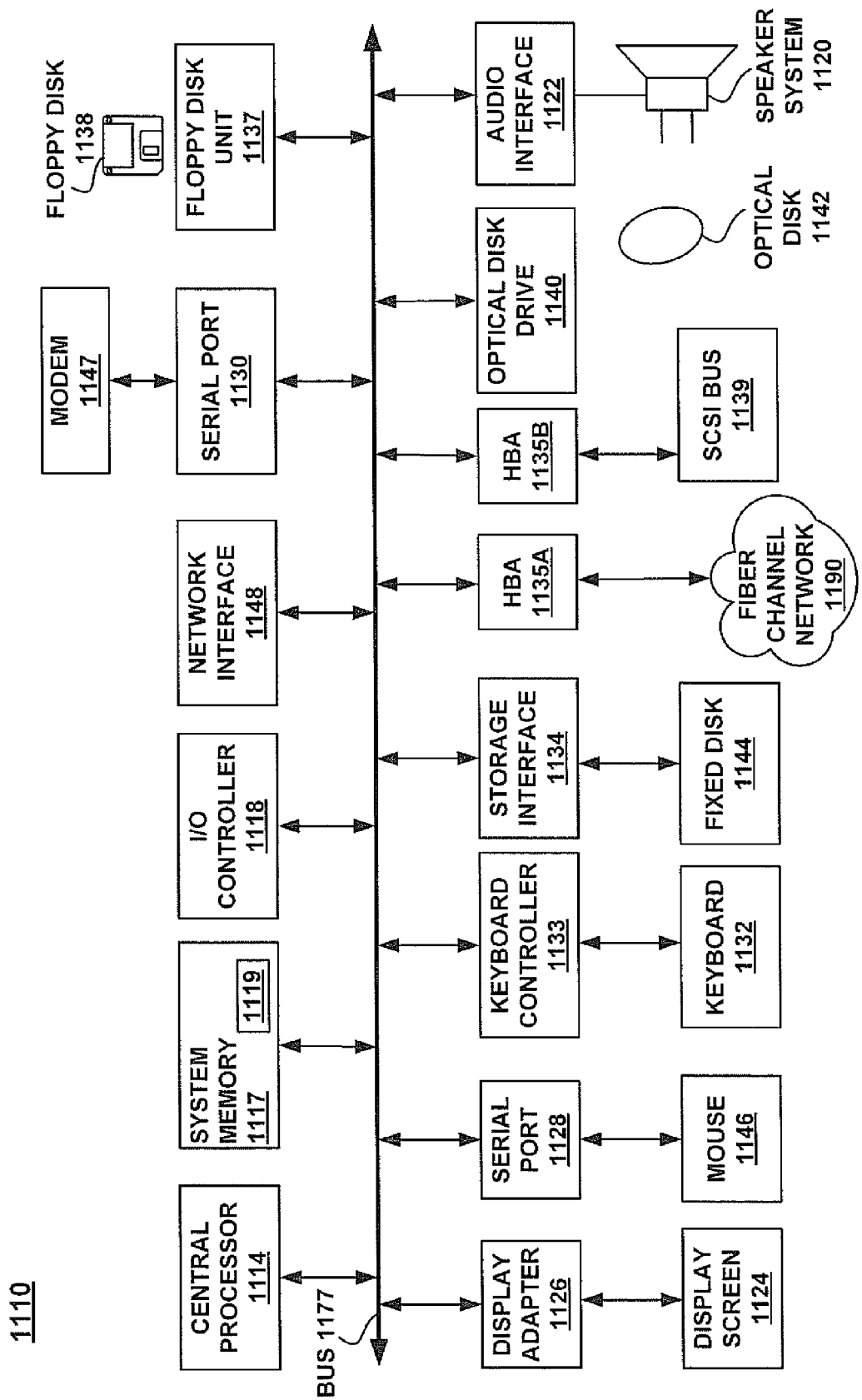
FIG. 8 depicts a block diagram of an exemplary computer system in accordance with one embodiment of the present invention.

FIG. 8 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1177 via serial port 1128), a modem 1147 (coupled to bus 1177 via serial port 1130), and a network interface 1148 (coupled directly to bus 1177).

Bus 1177 allows data communication between central processor 1114 and system memory 1117, which may include read-only memory (ROM) or flash memory (neither shown), and random access memory (RAM) (not shown), as previously noted. In one embodiment, instructions for performing an storage management method (e.g., similar to method 100, 400, etc.) are stored in one or more memories of computer system 1100 (e.g., in memory location 1119). The RAM is generally the main memory into which the operating system and application programs are loaded. In one embodiment, RAM 1117 includes storage management module (e.g., in memory location 1119). In one embodiment, a storage management module stored in memory location 1119 is similar to storage management module 800. The ROM or flash memory can contain, among other code, the Basic Input-Output system (BI/OS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present disclosure. The devices and subsystems can be interconnected in different ways from that shown in FIG. 7. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on network addressable storage using, for example, a transfer coordination component, a web browser, or other client software (not shown). Such a client allows client systems 1810, 1820 and 1830 to access data hosted by storage server 1840 or 1880 or one of the corresponding storage devices. FIG. 7 depicts the use of a network such as the Internet for exchanging data, but the present disclosure is not limited to the Internet or any particular network-based environment.

Thus, the presented systems and methods described above can facilitate efficient and effective storage management. In one embodiment, analysis of characteristics and conditions of components in one hierarchical level can be coordinated and linked to characteristics and conditions of components in another hierarchical level of a storage environment. Additional actions and operations that facilitate efficient and effective management of the storage resources can be implemented based upon results of the coordinated and linked analysis of characteristics and conditions of components in different hierarchical levels of the storage environment. In one embodiment, the presented systems and methods facilitate root cause analysis and proactive notification for risk assessment around a storage pool and linkage to file systems.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. The computer readable medium can include reprogrammable non-transient tangible computer readable media. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A method comprising:
allocating an amount of storage to a thin provision pool for use by a plurality of hosts, wherein a first amount of storage initially allocated to the plurality of hosts is greater than the amount of storage allocated to the thin provision pool;
performing a hierarchical configuration information process, including accessing information regarding hierarchical relationships of components associated with a storage environment, wherein the hierarchical relationships of components comprise linkages between storage pools at different levels within a storage environment hierarchy, wherein the different levels comprise at least the thin provision pool and a storage resource component;
performing a coordinated consumption analysis process in which at least part of an analysis of the consumption of the storage resources is coordinated across multiple levels of an active spindle hierarchy, wherein the coordinated consumption analysis process further comprises:
detecting a storage usage condition at an application level comprising at least a high storage pool utilization condition, wherein the storage usage condition further comprises at least an indication that a second amount of storage in use by the plurality of hosts may exceed the amount of storage allocated to the thin provision pool; and
notifying a user of the storage usage condition; and
performing a storage reclamation process comprising:
linking the storage usage condition at the application level to a resource at a storage resource level;
communicating a storage pool reclamation request from the application level to the resource at the storage resource level; and
reclaiming storage at the resource at the storage resource level,
wherein the storage reclamation process prevents input/output (I/O) access errors from the plurality of hosts by increasing the amount of storage allocated to the thin provision pool and preventing over-subscription of storage in the thin provision pool.

2. The method of claim 1 wherein the coordinated consumption analysis process comprises an end to end level linking in the active spindle hierarchy of the storage resource consumption.

3. The method of claim 1 wherein the coordinated consumption analysis process comprises linking the storage resource consumption at a storage pool level of the active spindle hierarchy to an application level of the active spindle hierarchy.

4. The method of claim 1 wherein the coordinated consumption analysis process comprises determining correlations between the consumption of the storage resources and the components, wherein at least one of the components is included in a different one of the multiple levels of the active spindle hierarchy than another one of the components.

5. The method of claim 1 wherein the coordinated consumption analysis process includes analyzing correlations between the consumption of the storage resources and the components, wherein at least one of the correlations crosses at least one level boundary of the multiple levels of the active spindle hierarchy.

6. The method of claim 1 further comprising performing an automated consumption notification process based upon results of the storage resource consumption detection process.

7. The method of claim 6 wherein the automated consumption notification process includes forwarding a notification to a user that a storage resource consumption threshold is reached.

8. The method of claim 1 further comprising performing an automated reclamation process based upon results of the coordinated consumption analysis process.

9. The method of claim 8 wherein reclamation directions are issued on a supported file system.

10. The method of claim 9 further comprising performing an automated storage allocation process in which the storage resources which are reclaimed by the automated reclamation process are automatically made available to components in need of access to the storage resources.

11. The method of claim 1 wherein the coordinated consumption analysis process comprises:
determining a violation condition of a storage resource consumption threshold in a storage level of the active spindle hierarchy; and
propagating the violation condition to a file system level of the active spindle hierarchy.

12. The method of claim 1 wherein the coordinated consumption analysis process includes linking a failure at a file system level to a storage pool level.

13. The method of claim 1 wherein the coordinated consumption analysis process includes detecting violations for high level storage resource consumption policies.

14. The method of claim 1 wherein the coordinated consumption analysis processing includes identifying file systems consuming storage from storage pools.

15. A non-transitory reprogrammable tangible computer readable medium having stored thereon, computer executable instructions that when executed by a computer system cause the computer system to perform a method comprising:
allocating an amount of storage to a thin provision pool for use by a plurality of hosts, wherein a first amount of storage initially allocated to the plurality of hosts is greater than the amount of storage allocated to the thin provision pool;
performing a hierarchical configuration information process, including accessing information regarding hierarchical relationships of components associated with a storage environment, wherein the hierarchical relationships of components comprise linkages between storage pools at different levels within a storage environment hierarchy, wherein the different levels comprise at least the thin provision pool and a storage resource component;
performing a coordinated consumption analysis process in which at least part of an analysis of the consumption of the storage resources is coordinated across multiple levels of an active spindle hierarchy, wherein the coordinated consumption analysis process further comprises:
detecting a storage usage condition at an application level comprising at least a high storage pool utilization condition, wherein the storage usage condition further comprises at least an indication that a second amount of storage in use by the plurality of hosts may exceed the amount of storage allocated to the thin provision pool; and
notifying a user of the storage usage condition; and
performing a storage reclamation process comprising:

linking the storage usage condition at the application level to a resource at a storage resource level;

communicating a storage pool reclamation request from the application level to the resource at the storage resource level; and reclaiming storage at the resource at the storage resource level, wherein the storage reclamation process prevents input/output (I/O) access errors from the plurality of hosts by increasing the amount of storage allocated to the thin provision pool and preventing over-subscription of storage in the thin provision pool.

16. The non-transitory reprogrammable tangible computer readable medium of claim 15 wherein the coordinated consumption analysis process comprises an end to end level linking in the active spindle hierarchy of the storage resource consumption.

17. The non-transitory reprogrammable tangible computer readable medium of claim 15 wherein the coordinated consumption analysis process includes analyzing correlations between the consumption of the storage resources and the components, wherein at least one of the correlations crosses at least one level boundary of the multiple levels of the active spindle hierarchy.

18. A computer system comprising:

a processor coupled to a computer readable storage medium and executing computer readable code which causes the computer system to perform operations including:

allocating an amount of storage to a thin provision pool for use by a plurality of hosts, wherein a first amount of storage initially allocated to the plurality of hosts is greater than the amount of storage allocated to the thin provision pool;

performing a hierarchical configuration information process, including accessing information regarding hierarchical relationships of components associated with a storage environment, wherein the hierarchical relationships of components comprise linkages between storage pools at different levels within a storage environment hierarchy, wherein the different levels comprise at least the thin provision pool and a storage resource component;

performing a coordinated consumption analysis process in which at least part of an analysis of the consumption of the storage resources is coordinated across multiple levels of an active spindle hierarchy, wherein the coordinated consumption analysis process further comprises:

detecting a storage usage condition at an application level comprising at least a high storage pool utilization condition, wherein the storage usage condition further comprises at least an indication that a second amount of storage in use by the plurality of hosts may exceed the amount of storage allocated to the thin provision pool; and notifying a user of the storage usage condition; and performing a storage reclamation process comprising:

linking the storage usage condition at the application level to a resource at a storage resource level;

communicating a storage pool reclamation request from the application level to the resource at the storage resource level; and reclaiming storage at the resource at the storage resource level, wherein the storage reclamation process prevents input/output (I/O) access errors from the plurality of hosts by increasing the amount of storage allocated to the thin provision pool and preventing over-subscription of storage in the thin provision pool.

19. The computer system of claim 18 wherein the coordinated consumption analysis process comprises an end to end level linking in the active spindle hierarchy of the storage resource consumption.

20. The computer system of claim 18 wherein the coordinated consumption analysis process includes analyzing correlations between the consumption of the storage resources and the components, wherein at least one of the correlations crosses at least one level boundary of the multiple levels of the active spindle hierarchy.

* * * * *